United States Patent
Kadowaki (10) Patent No.: US 8,659,586 B2
(45) Date of Patent: Feb. 25, 2014

(54) STEREOSCOPIC IMAGE DISPLAY DEVICE USING A BARRIER LIQUID CRYSTAL DEVICE

(75) Inventor: Jun Kadowaki, Chiba (JP)

(73) Assignee: Seiko Instruments Inc. (JP)

( * ) Notice: Subject to any disclaimer, the term of this patent is extended or adjusted under 35 U.S.C. 154(b) by 183 days.

(21) Appl. No.: 13/362,427

(22) Filed: Jan. 31, 2012

(65) Prior Publication Data

US 2012/0194495 A1 Aug. 2, 2012

(30) Foreign Application Priority Data

Feb. 2, 2011 (JP) ................................ 2011-020839

(51) Int. Cl.
*G06F 3/038* (2013.01)

(52) U.S. Cl.
USPC ......................................................... 345/208

(58) Field of Classification Search
None
See application file for complete search history.

(56) References Cited

U.S. PATENT DOCUMENTS

| | | | | |
|---|---|---|---|---|
| 2009/0102839 A1* | 4/2009 | Kim et al. | ...................... | 345/419 |
| 2009/0103177 A1* | 4/2009 | Jang et al. | ...................... | 359/462 |
| 2011/0006979 A1* | 1/2011 | Min et al. | ...................... | 345/156 |
| 2011/0157264 A1* | 6/2011 | Seshadri et al. | .............. | 345/698 |

FOREIGN PATENT DOCUMENTS

JP 2006243710 9/2006

* cited by examiner

*Primary Examiner* — Adam R Giesy
(74) *Attorney, Agent, or Firm* — Adams & Wilks (57) ABSTRACT

An LC barrier panel of a stereoscopic image display device has a substrate on which first barrier pixels and second barrier pixels are alternately arranged in a vertical direction and on which the first barrier pixels and third barrier pixels are alternately arranged in a horizontal direction. On a counter substrate, a counter electrode is formed to cover the entire surface of the display region. The third barrier pixels and the counter electrode are supplied with the same drive signal while an effective voltage is applied between the counter electrode and the first and second barrier pixels to perform vertical stripe display. Alternatively, the second barrier pixels and the counter electrode are supplied with the same drive signal while an effective voltage is applied between the counter electrode and the first and third barrier pixels to perform horizontal stripe display.

12 Claims, 7 Drawing Sheets

PRIOR ART

FIG. 11A

PRIOR ART

FIG. 11B

PRIOR ART

STEREOSCOPIC IMAGE DISPLAY DEVICE USING A BARRIER LIQUID CRYSTAL DEVICE

BACKGROUND OF THE INVENTION

1. Field of the Invention

The present invention relates to a stereoscopic image display device using a liquid crystal barrier panel (LC barrier-panel). In particular, the present invention relates to a stereoscopic image display device capable of stereoscopic view in both portrait and landscape screens by rotating a display panel together with the LC barrier-panel.

2. Description of the Related Art

As stereoscopic image display systems, there are an auto-stereoscopic image display system and a glasses stereoscopic system. As the glasses stereoscopic system, a head mount display system and a system using polarized glasses are commercialized. However, it is inconvenient to wear glasses or the like to view a display image on a mobile device. The auto-stereoscopic image display system does not have such inconvenience and is suitable for a display device of mobile use.

As the auto-stereoscopic image display system, a parallax barrier system is known. The parallax barrier system uses a barrier panel disposed on the front or back surface of a display panel. A left image and a right image are displayed on vertical pixel columns (vertical lines) every other line alternately on the display panel. For instance, the right image for the right eye is displayed on odd-numbered vertical lines while the left image for the left eye is displayed on even-numbered vertical lines. The barrier panel is a shading mask of a vertical stripe having substantially the same pitch as the vertical lines of the display panel. When the observer sees the display panel through the barrier panel, the right eye can see the odd-numbered vertical lines but cannot see the even-numbered vertical lines that are blocked by the barrier panel. The left eye can see the even-numbered vertical lines but cannot see the odd-numbered vertical lines that are blocked by the barrier panel. Therefore, the observer can see the left and right images on the display panel simultaneously by naked eyes so as to recognize a stereoscopic image.

In recent mobile devices, the display panel can be rotated to view both portrait and landscape images. However, the barrier panel is fixed to the display panel in the parallax barrier system, and hence, when the display panel is rotated, the vertical stripe of the barrier panel is also rotated to be a horizontal stripe. As a result, the stereoscopic image utilizing parallax between left and right images cannot be observed. Therefore, Japanese Patent Application Laid-open No. 2006-243710 (hereinafter, referred to as Patent Document 1) proposes a barrier liquid crystal panel (LC barrier panel) that can switch between vertical and horizontal stripes so as to display the vertical stripe even if the display panel is rotated.

Figure 10:
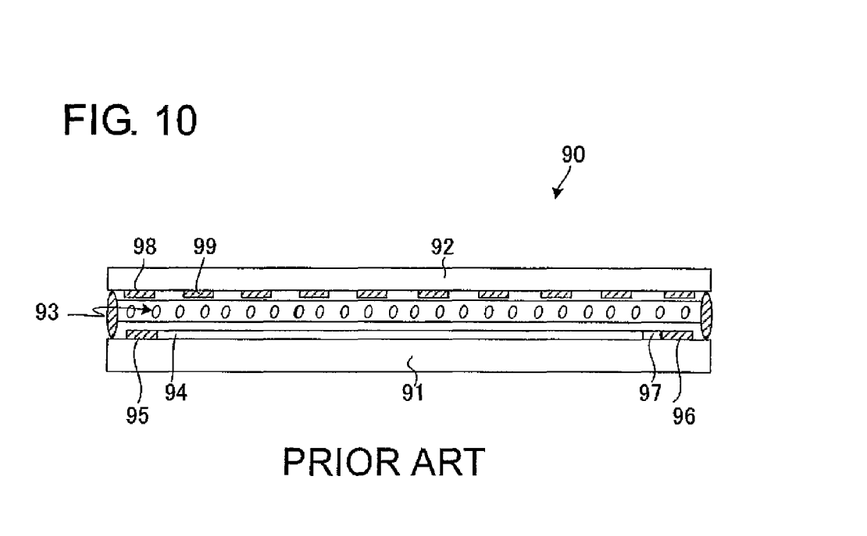
FIG. 10 is a cross-sectional view of a conventional known LC barrier panel.
Figure 11A:
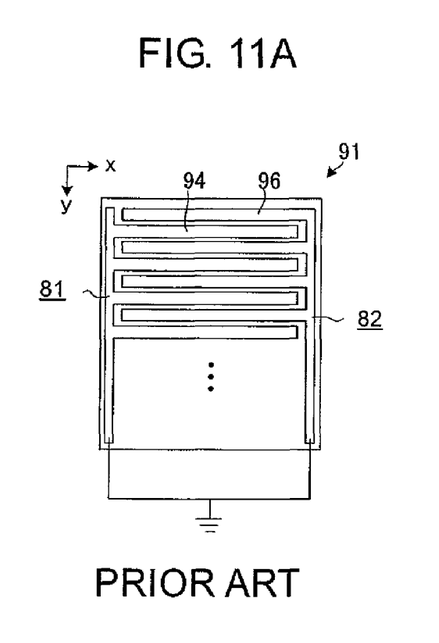
FIG. 11A is a plan view schematically illustrating a shape of electrodes formed on a substrate of the conventional known LC barrier panel.
Figure 11B:
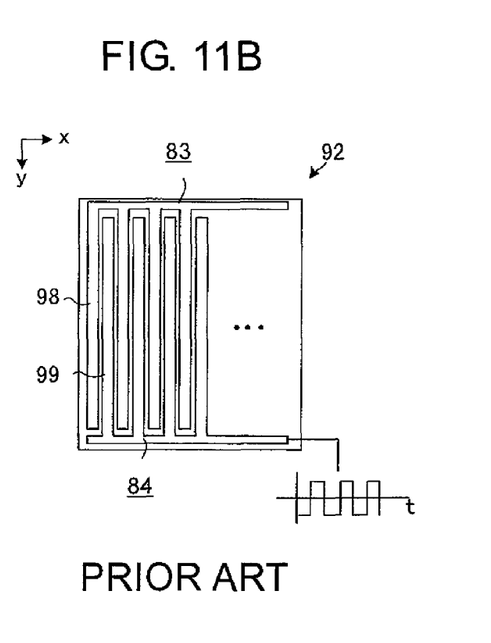
FIG. 11B is a plan view schematically illustrating a shape of electrodes formed on a counter substrate of the conventional known LC barrier panel.

FIG. 10 is a cross-sectional view of a LC barrier panel 90 disclosed in Patent Document 1. Liquid crystal 93 is filled in between a first substrate 91 and a second substrate 92. FIGS. 11A and 11B schematically illustrate shapes of electrodes formed on inner surfaces (facing the liquid crystal 93) of the first substrate and the second substrate, respectively. As illustrated in FIG. 11A, on the first substrate 91, first electrodes 94 and second electrodes 96 having a band-like shape elongated in an x direction are formed so as to engage each other. In addition, the plurality of first electrodes 94 are electrically connected by a first connection electrode 95. Those are referred to as a first electrode set 81. Similarly, the plurality of second electrodes 96 are electrically connected by a second connection electrode 96. Those are referred to as a second electrode set 82. Therefore, the electrodes of the first electrode set 81 and the second electrode set 82 have a comb-like shape. On the other hand, as illustrated in FIG. 11B, on the second substrate 92, third electrodes 98 and fourth electrodes 99 having a band-like shape elongated in a y direction are formed so as to engage each other. In addition, the plurality of third electrodes 98 are electrically connected by a third connection electrode. Those are referred to as a third electrode set 83. In addition, the plurality of fourth electrodes 99 are electrically connected by a fourth connection electrode. Those are referred to as a fourth electrode set 84. The electrodes of the third electrode set 83 and the fourth electrode set 84 also have a comb-like shape.

The LC barrier panel 90 maintains an opaque state when no voltage is applied. In other words, the LC barrier panel 90 is structured to be a normally black state. As illustrated in FIG. 11B, an alternating voltage is applied to only the fourth electrode set 84 on the second substrate 92. Then, the first electrode set 81 and the second electrode set 82 on the first substrate 91 are connected to the ground (GND) so that a vertical stripe transparent region is formed.

The LC barrier panel 90 is disposed on the display panel. The right image is displayed on the display pixel columns that can be seen by the right eye while the left image is displayed on the display pixel columns that can be seen by the left eye, and hence the stereoscopic image can be recognized. When this display panel is rotated by 90 degrees to be horizontal, the alternating voltage is applied to only the first electrode set 81 of the first substrate 91 while the third electrode set 83 and the fourth electrode set 84 of the second substrate 92 are connected to GND. Thus, the vertical stripe transparent region is formed similarly. On the display panel, the right image is displayed on the display pixel columns that can be seen by the right eye while the left image is displayed on the display pixel columns that can be seen by the left eye, and hence the stereoscopic image is recognized.

However, the LC barrier panel 90 described in Patent Document 1 has gaps formed between the electrodes on both the first substrate 91 and the second substrate 92. For instance, there are gaps between the first electrode set 81 and the second electrode set 82 on the first substrate 91. In addition, there are also gaps between the third electrode set 83 and the fourth electrode set 84 on the second substrate 92. Therefore, electromagnetic noise or static electricity may enter the display panel from the outside through the LC barrier panel 90 so that a malfunction or breakdown of an internal element or a thin film transistor (TFT) may occur.

SUMMARY OF THE INVENTION

Therefore, it is an object of the present invention to provide a LC barrier-panel having a protective function against external electromagnetic noise or static electricity.

A stereoscopic image display device of the present invention includes a LC barrier-panel having any one of the following structures, which is disposed on an observer side of a display panel that simultaneously displays an image for the right eye and an image for the left eye. The LC barrier-panel is controlled by a drive portion. The LC barrier-panel comprises: a substrate on which first barrier pixels and second barrier pixels are alternately arranged in a vertical direction, and third barrier pixels and the first barrier pixels are alternately arranged in a horizontal direction; a counter substrate on which a counter electrode is formed so as to be opposed to all the first barrier pixels, the second barrier pixels, and the third barrier pixels; a sealant for bonding the substrate and the counter substrate with a predetermined gap; a liquid crystal layer filled in the predetermined gap. The drive portion supplies drive signals to the first barrier pixels, the second barrier pixels, the third barrier pixels, and the counter electrode. The drive portion supplies the third barrier pixels and the counter electrode with the same drive signal, and supplies the first barrier pixels and the second barrier pixels with such a drive signal that an effective voltage is applied to the liquid crystal layer provided between the counter electrode and the first barrier pixels and the second barrier pixels, to thereby perform vertical stripe display. Alternatively, the drive portion gives the same driving-waveform to the second barrier pixels and the counter electrode, and supplies the first barrier pixels and the third barrier pixels with such a drive signal that an effective voltage is applied to the liquid crystal layer provided between the counter electrode and the first and the third barrier pixels, to thereby perform horizontal stripe display. In this way, a vertical stripe and a horizontal stripe are switched so as to perform barrier display.

Here, the same drive signal to be supplied to the third barrier pixels and the counter electrode, or the same drive signal to be supplied to the second barrier pixels and the counter electrode is set to a constant voltage. In addition, this constant voltage is set to a GND potential.

In addition, in the case of the vertical stripe barrier display, the drive signal supplied to the first barrier pixels and the drive signal supplied to the second barrier pixels are set to be alternating voltages having opposite polarities to each other. In addition, in the case of the horizontal stripe barrier display, the drive signal supplied to the first barrier pixels and the drive signal supplied to the third barrier pixels are set to be alternating voltages having opposite polarities to each other.

In addition, a touch panel is disposed on the observer side of the counter substrate. In this case, detection electrodes constituting the touch panel are formed on the upper surface of the counter substrate.

According to the present invention, despite that the counter electrode having a filled-in shape covering the entire surface of a display region is formed on the counter substrate, the vertical stripe and the horizontal stripe can be switched so as to perform the barrier display. Therefore, it is possible to achieve both shielding of electromagnetic noise or static electricity entering the display screen and a variable structure of the barrier stripe.

DETAILED DESCRIPTION OF THE PREFERRED EMBODIMENTS

A stereoscopic image display device of the present invention includes a LC barrier-panel having any one of the following structures, which is disposed on an observer side of a display panel that simultaneously displays an image for the right eye and an image for the left eye. The LC barrier-panel to be used for the present invention includes a liquid crystal layer filled in and sealed between a substrate and a counter substrate. First barrier pixels and second barrier pixels are formed on the surface of the substrate on the liquid crystal layer side to be arranged alternately in the vertical direction, and the first barrier pixels and third barrier pixels are arranged alternately in the horizontal direction. On the surface of the counter substrate on the liquid crystal layer side, there is formed a counter electrode to be opposed to each of the first barrier pixels, the second barrier pixels, and the third barrier pixels. Therefore, the counter electrode may have a filled-in shape covering the entire surface of a display region. And the LC barrier panel is controlled by a drive portion.

When the drive portion supplies the third barrier pixels and the counter electrode with the same drive signal, and supplies the first barrier pixels and the second barrier pixels with such a drive signal that an effective voltage is applied to the liquid crystal layer provided between the counter electrode and those pixels, the barrier display becomes the vertical stripe. Alternatively, when the drive portion supplies the second barrier pixels and the counter electrode with the same drive signal, and supplies the first barrier pixels and the third barrier pixels with such a drive signal that an effective voltage is applied to the liquid crystal layer provided between the counter electrode and those pixels, the barrier display becomes the horizontal stripe. In this way, the drive portion can perform the barrier display switching between the vertical stripe and the horizontal stripe. Here, because the counter electrode of the counter substrate is formed to cover the entire surface of the barrier display region, it is possible to shield electromagnetic noise entering the display screen so as to prevent a malfunction of an internal element and simultaneously to prevent electrical breakdown due to static electricity.

In addition, the waveform of the same drive signal to be supplied to the third barrier pixels and the counter electrode in the vertical stripe display, or the waveform of the same drive signal to be supplied to the second barrier pixels and the counter electrode in the horizontal stripe display is set to a constant voltage. With this structure, electromagnetic noise radiated externally from the LC barrier-device is reduced. Further, this constant voltage is set to a GND potential, and hence it is possible to shield electromagnetic noise entering from the outside or electromagnetic noise radiating to the outside.

In addition, when performing the barrier display of the vertical stripe, the drive portion supplies the first barrier pixels and the second barrier pixels with alternating voltages having opposite polarities to each other. When performing the barrier display of the horizontal stripe, the drive portion supplies the first barrier pixels and the third barrier pixels with alternating voltages having opposite polarities to each other. Because the adjacent barrier electrodes formed on the same flat surface are applied with alternating voltages having opposite polarities to each other, generation of electromagnetic noise is suppressed. Therefore, it is possible to obtain an effect of reducing electromagnetic noise radiated to the adjacent display panel or touch panel so as to prevent a malfunction of the display panel or the touch panel.

Further, a first connection wiring for connecting the plurality of first barrier pixels vertically, a second connection wiring for connecting the plurality of second barrier pixels vertically, and a third connection wiring for connecting the plurality of third barrier pixels vertically are disposed vertically in parallel. Then, the plurality of first barrier pixels and the first connection wiring constitute a first barrier electrode, the plurality of second barrier pixels and the second connection wiring constitute a second barrier electrode, and the plurality of third barrier pixels and the third connection wiring constitute a third barrier electrode. In this case, a jumper electrode that is electrically separated from the counter electrode is formed on the counter substrate, and any one of the first barrier electrode, the second barrier electrode, and the third barrier electrode is electrically connected to the jumper electrode via a conductive material mixed into a sealant.

In addition, the third connection wiring obliquely connects the third barrier pixels adjacent to each other vertically. In the stereoscopic image display device having the structure, in which the LC barrier-device is disposed on the observer side of the display panel for simultaneously displaying an image for the right eye and an image for the left eye in different lines, a black mask is disposed between sub-pixels when one pixel of the display panel is formed of red (R), green (G), and blue (B) sub-pixels. Therefore, when a voltage is applied to the third barrier pixel electrode so that the horizontal stripe is displayed, as to the third connection wiring, a thin stripe is displayed in the direction perpendicular to the horizontal stripe. Therefore, only by changing the angle of view a little, there occur a case where the black mask of the display panel and the thin stripe of the barrier display panel overlap each other and a case where the black mask and the thin stripe do not overlap each other, resulting in a large change in luminance of the display. Therefore, the third connection wiring is formed in an oblique direction. As a result, the overlapping between the thin stripe of the barrier display panel and the black mask between the sub-pixels is equalized with respect to the angle of view, and hence display quality of the stereoscopic image is improved.

Hereinafter, embodiments of the present invention are described in detail with reference to the drawings.

First Embodiment

Figure 1A:
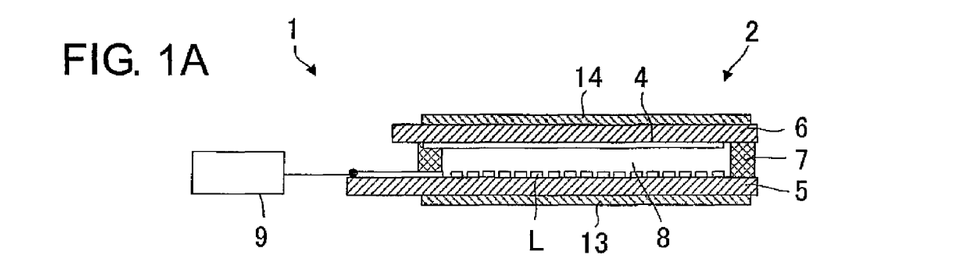
FIG. 1A is an explanatory diagram of a LC barrier-device according to a first embodiment of the present invention.
Figure 1B:
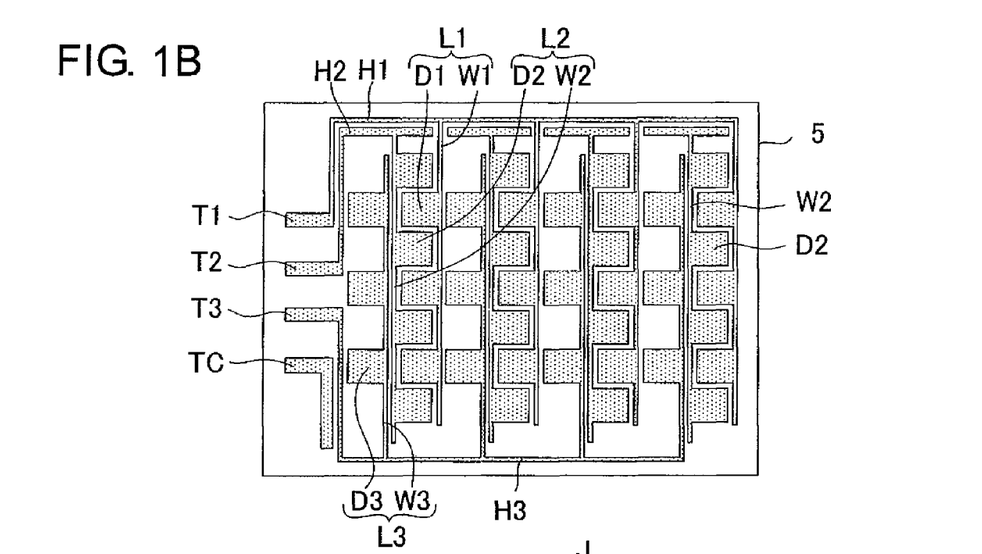
FIG. 1B is a schematic diagram illustrating electrodes formed on a substrate of the LC barrier panel of the first embodiment.
Figure 1C:
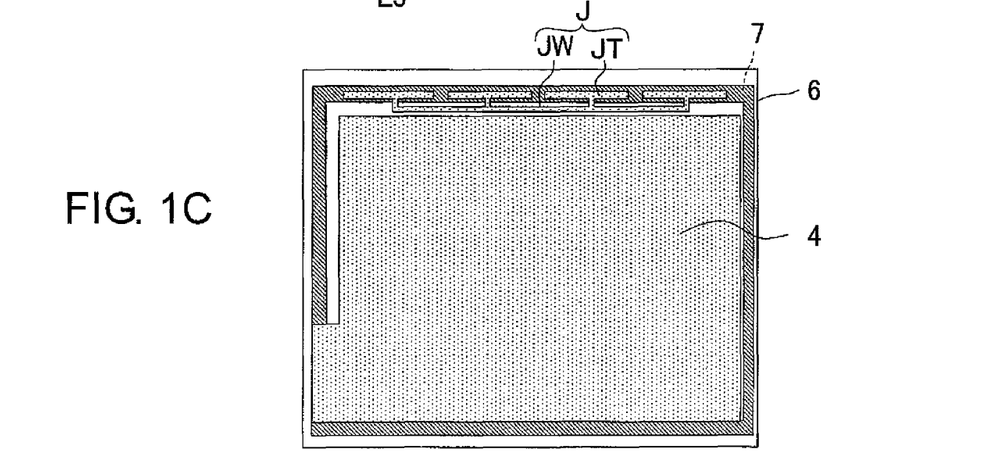
FIG. 1C is a schematic diagram illustrating a counter electrode formed on a counter substrate of the LC barrier panel of the first embodiment.

A LC barrier-device 1 of this embodiment is described. FIG. 1A is a schematic diagram illustrating a cross-sectional structure of the LC barrier-device 1 including a LC barrier panel 2 and a drive portion 9. FIG. 1B is a plan view schematically illustrating electrodes formed on a substrate 5. FIG. 1C is a plan view schematically illustrating electrodes formed on a counter substrate 6. As illustrated in FIG. 1A, the substrate 5 and the counter substrate 6 are bonded together with a sealant 7 so that the electrodes thereof are opposed to each other. A liquid crystal layer 8 is disposed between the substrate 5 and the counter substrate 6, a barrier electrode L is formed on the surface of the substrate 5, and a counter electrode 4 is formed on the surface of the counter substrate 6. The drive portion 9 supplies the barrier electrode L and the counter electrode 4 with a display voltage (drive signal). In addition, a first polarizer 13 is disposed on the outer side of the substrate 5, and a second polarizer 14 is disposed on the outer side of the counter substrate 6. The first polarizer 13 and the second polarizer 14 are set to a normally white state to be transparent when no electric field is applied. Note that, the first polarizer 13 of the LC barrier-device 1 can serve also as a polarizer on the display panel. In other words, in the structure of this embodiment, the first polarizer 13 can serve also as the polarizer of the display panel disposed below.

As illustrated in FIG. 1B, first barrier pixels D1 and second barrier pixels D2 are arranged alternately in the vertical direction on the substrate 5. In addition, the first barrier pixels D1 and third barrier pixels D3 are arranged alternately in the horizontal direction. A first connection wiring W1 connects the first barrier pixels D1 vertically. A second connection wiring W2 connects the second barrier pixels D2 vertically. A third connection wiring W3 connects the third barrier pixels D3 vertically. Therefore, the first connection wiring W1, the second connection wiring W2, and the third connection wiring W3 are wired vertically in parallel. The plurality of first barrier pixels D1 and the first connection wiring W1 connecting the first barrier pixels D1 constitute a first barrier electrode L1. Similarly, a second barrier electrode L2 is constituted by the plurality of second barrier pixels D2 and the second connection wiring W2 connecting the second barrier pixels D2. A third barrier electrode L3 is constituted by the plurality of third barrier pixels D3 and the third connection wiring W3 connecting the third barrier pixels D3. Then, the first barrier electrodes L1, the second barrier electrodes L2, and the third barrier electrodes L3 are disposed repeatedly in a plurality of rows.

As illustrated in FIG. 1B, the plurality of first barrier electrodes L1 are connected to a lead-out electrode H1, and the lead-out electrode H1 is connected to a terminal electrode T1. In other words, the plurality of first barrier electrodes L1 are electrically connected to the terminal electrode T1 via the lead-out electrode H1. Similarly, the plurality of third barrier electrodes L3 are electrically connected to a terminal electrode T3 via a lead-out electrode H3. On the other hand, the plurality of second barrier electrodes L2 are not connected to each other on the substrate 5 but are electrically connected using jumper electrodes J disposed on the counter substrate 6. Then, a terminal electrode T2 and the second barrier electrode L2 at the left end are connected by a lead-out electrode H2 on the substrate 5.

FIG. 1C schematically illustrates the shape of the electrodes formed on the counter substrate 6, which is not a view from the electrode forming surface but illustrates the electrode shape viewed from the second polarizer 14 side as a perspective view through the counter substrate 6. As illustrated in FIG. 1C, the counter electrode 4 is formed on the counter substrate 6 over the entire surface of the display region, and in a vicinity of the upper side thereof, the jumper electrodes J electrically separated from the counter electrode 4 are formed. On the outer periphery of the counter substrate 6, the sealant 7 is provided. A conductive material (not shown), for example, conductive particles are dispersed in the sealant 7. The jumper electrode J is formed of a jumper terminal JT positioned below the sealant 7 and a jumper connection wiring JW positioned inside the sealant 7 (on the liquid crystal layer 8 side). The substrate 5 and the counter substrate 6 are bonded together with the sealant 7 in which the conductive particles are dispersed. On the substrate 5, the lead-out electrode H2 is formed so as to be opposed to the jumper terminal JT in the sealant 7. Therefore, the lead-out electrode H2 and the jumper terminal JT are electrically connected to each other via the conductive particles contained in the sealant 7. Each lead-out electrode H2 and each opposed jumper terminal JT are connected to each other via the jumper connection wiring JW positioned inside the sealant 7. As a result, the terminal electrode T2 and all the second barrier electrodes L2 are electrically connected via the jumper electrodes J. At the same time, the counter electrode 4 and a terminal electrode TC are also electrically connected to each other via the conductive particles contained in the sealant 7. The lead-out electrode H2 is used for increasing the area of the counter electrode in this embodiment, but it is also possible to use the second barrier electrode L2 extending to the position of the sealant 7.

Figure 2A:
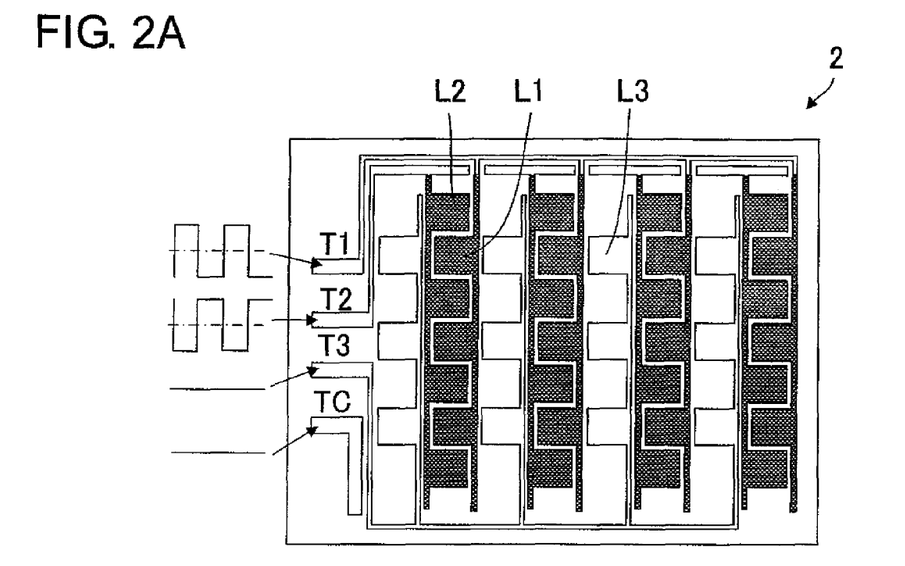
FIG. 2A is a schematic diagram illustrating a vertical stripe display state of the LC barrier-device of the first embodiment.
Figure 2B:
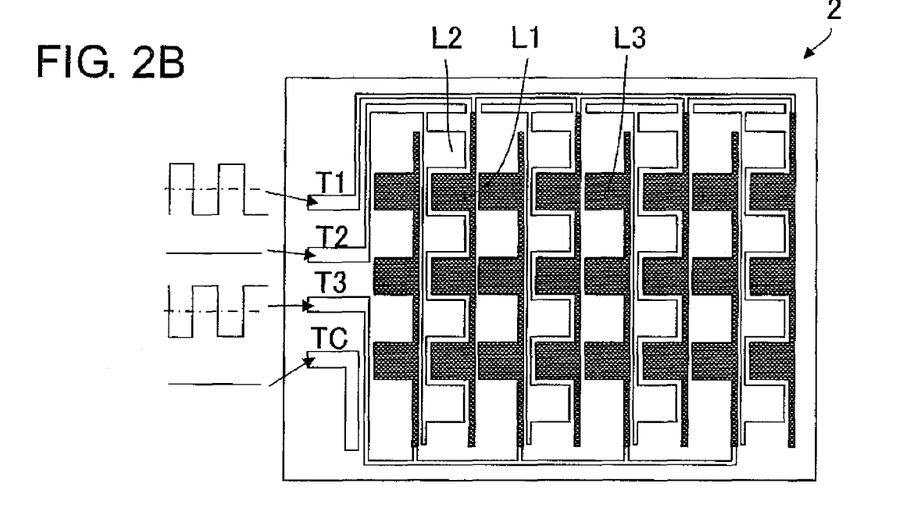
FIG. 2B is a schematic diagram illustrating a horizontal stripe display state of the LC barrier-device of the first embodiment.

FIGS. 2A and 2B are diagrams illustrating display states of the LC barrier-device 1 of this embodiment. FIG. 2A illustrates a state in which the first barrier electrode L1 and the second barrier electrode L2 are turned on so that the vertical stripe barrier is formed. FIG. 2B illustrates a state in which the first barrier electrode L1 and the third barrier electrode L3 are turned on so that the horizontal stripe barrier is formed. In the state of FIG. 2A, the drive portion 9 supplies the terminal electrode T1 and the terminal electrode T2 with the alternating voltages and supplies the terminal electrode T3 and the terminal electrode TC with the constant voltages. With this structure, the first barrier electrode L1 and the second barrier electrode L2 are turned on so as to be a non-transparent state. As a result, the vertical stripe barrier is formed. In the state of FIG. 2B, the drive portion 9 supplies the terminal electrode T1 and the terminal electrode T3 with the alternating voltages and supplies the terminal electrode T2 and the terminal electrode TC with the constant voltages. Then, the first barrier electrode L1 and the third barrier electrode L3 are turned on so as to be the non-transparent state. As a result, the horizontal stripe barrier is formed. The horizontal stripe barrier is a barrier for a stereoscopic image when viewing in a portrait screen by rotating the LC barrier panel 2.

In this case, it is preferred to always supply the GND potential to the terminal electrode TC, namely the counter electrode 4. Thus, it is prevented that electromagnetic noise enters from the outside and penetrates to the substrate 5 side. In other words, it is possible to shield external electromagnetic noise. In addition, if static electricity is applied, static electricity can be discharged from the counter electrode 4 to the outside through the terminal electrode TC. In addition, it is preferred to supply alternating voltages having opposite polarities to two types of barrier electrodes to be turned on. In other words, alternating voltages having opposite polarities are applied to the terminal electrode T1 and the terminal electrode T2 in the case of FIG. 2A, and alternating voltages having opposite polarities are applied to the terminal electrode T1 and the terminal electrode T3 in the case of FIG. 2B. Further, the first barrier electrode L1 and the second barrier electrode L2, as well as the first barrier electrode L1 and the third barrier electrode L3 are formed to be close to each other on the same surface. Therefore, electromagnetic noises generated from the turned-on two types of barrier electrodes are canceled by each other. Further, because the counter electrode 4 is a filled-in electrode, the generated electromagnetic noise cannot be radiated externally. With this structure, even if a touch panel or a display panel is disposed close to the LC barrier panel 2, a malfunction due to the electromagnetic noise hardly occurs in the touch panel or the display panel.

Note that, a transparent conductive film made of indium tin oxide (ITO) or the like is used for the first to third barrier electrodes L1 to L3, and the counter electrode 4. In addition, there are possible various arrangements of the barrier pixels D and the barrier electrodes L, without limiting to the form illustrated in the figures. For instance, the number of the first barrier pixels D1 and the number of the second barrier pixels D2 in the vertical direction may be the same. Alternatively, the number of the first barrier pixels D1 may be larger by one than the number of the second barrier pixels D2. In addition, it is possible to dispose the third barrier electrode L3 also on the right end portion so that the number of the third barrier electrodes L3 is larger than the number of the first and second barrier electrodes L1 and L2. On the contrary, the first barrier electrodes L1 or the second barrier electrodes L2 may be disposed on the left and right outermost rows so that the number of the first barrier electrodes L1 or the second barrier electrodes L2 is larger than the number of the third barrier electrodes L3. In addition, the plurality of second barrier electrodes L2 are electrically connected via the jumper electrodes J disposed on the counter substrate 6, but the present invention is not limited to this structure. It is also possible to form an insulating layer on the first connection wiring W1 of the first barrier electrodes L1 which are present between the plurality of second barrier electrodes L2, and to form the jumper connection wiring JW on the insulating layer, to thereby electrically connect the second barrier electrodes L2 to the terminal electrode T2 via the lead-out electrode H2.

Second Embodiment

This embodiment is different from the first embodiment in that a touch panel 11 is disposed on the upper side of the LC barrier panel 2, and the other structure is the same. Therefore, the different point from the first embodiment is described below.

Figure 3A:
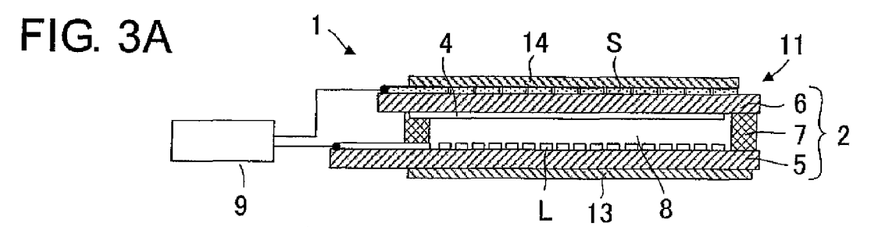
FIG. 3A is an explanatory diagram of a LC barrier-device with touch panel according to a second embodiment of the present invention.

FIG. 3A schematically illustrates a cross section of the LC barrier-device 1 with touch panel in which the touch panel 11 is disposed on the LC barrier panel 2. Detection electrodes S are formed on the upper surface of the counter substrate 6, and the second polarizer 14 is disposed on the detection electrodes S. The touch panel 11 is a capacitance detection type touch panel, in which the capacitance changes when a finger approaches the detection electrode S. This capacitance change is detected by a detection circuit included in the drive portion 9 so as to specify a position of the finger. Here, the counter electrode 4 that is a filled-in electrode is present between the barrier electrodes L and the detection electrodes S. Therefore, even if electromagnetic noise is generated from the barrier electrode L or the display screen of the display panel disposed thereunder, the noise is shielded by the counter electrode 4. As a result, a malfunction of the touch panel 11 can be prevented.

Figure 3B:
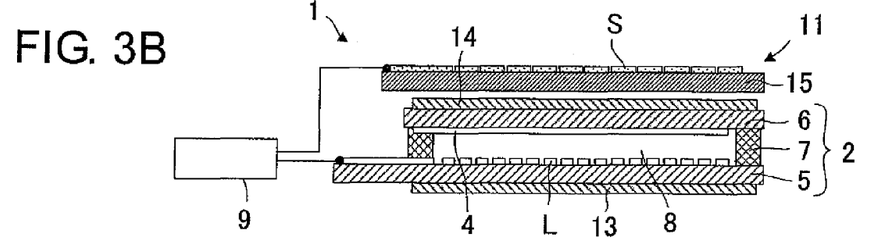
FIG. 3B is an explanatory diagram of a LC barrier-device with touch panel of the second embodiment.

FIG. 3B schematically illustrates a cross section of the LC barrier-device 1 with touch panel in which the touch panel 11 is disposed separately from the LC barrier panel 2. The touch panel 11 is constituted by a touch substrate 15 and the detection electrodes S formed on the upper surface thereof. Because the touch panel 11 and the LC barrier panel 2 are separated from each other, when a finger or the like is brought into contact with the touch panel 11, the LC barrier panel 2 is not pressed. Therefore, no display unevenness occurs on the LC barrier panel 2. Other effects are the same as those in the case of FIG. 3A. Note that, the touch panel 11 is not limited to the capacitance detection type touch panel but may be a resistance detection type touch panel.

Third Embodiment

Figure 4A:
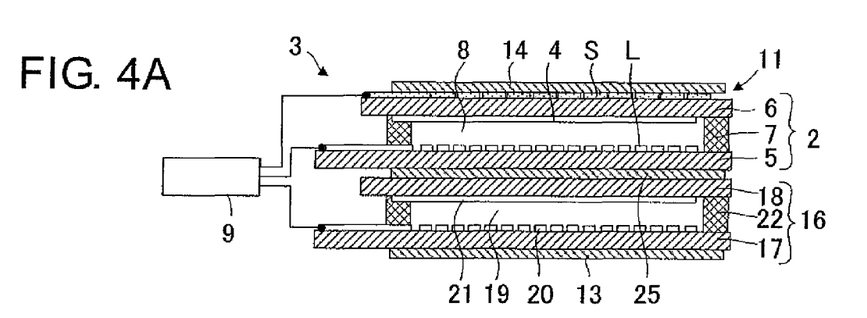
FIG. 4A is an explanatory diagram of a stereoscopic image display device according to a third embodiment of the present invention.
Figure 4B:
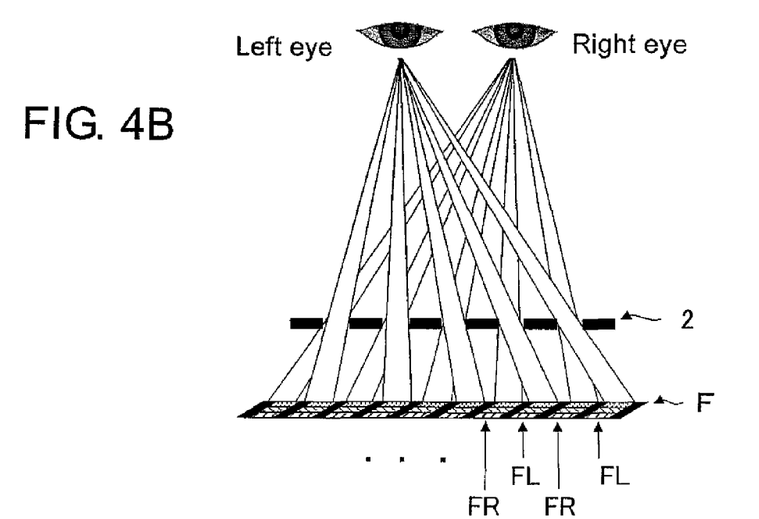
FIG. 4B is a schematic diagram illustrating the principle of stereoscopic view.

An embodiment of the stereoscopic image display device is described. FIG. 4A schematically illustrates a cross-sectional structure of a stereoscopic image display device 3. FIG. 4B is a diagram illustrating the principle of stereoscopic view. As illustrated in FIG. 4A, the stereoscopic image display device 3 includes the touch panel 11, the LC barrier panel 2, a liquid crystal display panel 16 as a display panel, and the drive portion 9 for driving those components. The touch panel 11 is constituted by the detection electrodes S formed on the upper surface of the counter substrate 6 of the LC barrier panel 2. The LC barrier panel 2 includes the substrate 5, the counter substrate 6 that is bonded to the upper surface of the substrate 5 via the sealant 7, the liquid crystal layer 8 filled in and sealed between the substrate 5 and the counter substrate 6, and the barrier electrodes L and the counter electrode 4 formed on the liquid crystal layer sides of the substrate 5 and the counter substrate 6, respectively.

The liquid crystal display panel 16 has a structure in which a lower substrate 17 and an upper substrate 18 are bonded together with a seal 22, and a liquid crystal layer 19 is filled in and sealed between the lower substrate 17 and the upper substrate 18. On the liquid crystal layer sides of the lower substrate 17 and the upper substrate 18, pixel electrodes 20 and a common electrode 21 are formed, respectively. Each pixel electrode 20 on the lower substrate 17 is connected to a TFT (not shown), which controls current to be supplied to each pixel according to an image signal. The first polarizer 13 is disposed under the lower substrate 17, a third polarizer 25 is disposed between the upper substrate 18 and the substrate 5, and the second polarizer 14 is disposed on the upper side of the counter substrate 6. Hence, a display image displayed on the liquid crystal display panel 16 and the barrier displayed on the LC barrier panel 2 are visualized. The drive portion 9 supplies a display voltage to the LC barrier panel 2, supplies an image signal to the liquid crystal display panel 16, and receives a detected signal from the touch panel 11 so as to perform position detection.

When the stereoscopic image display device 3 is rotated by 90 degrees, the drive portion 9 performs conversion processing of the image signal for rotating the image displayed on the liquid crystal display panel 16 by 90 degrees, and supplies the converted image signal to the liquid crystal display panel 16. Further, the drive portion 9 switches from one state of supplying the terminal electrode T1 and the terminal electrode T2 with the display voltage while supplying the terminal electrode T3 and the terminal electrode TC with a non-display voltage to the other state of supplying the terminal electrode T1 and the terminal electrode T3 with the display voltage while supplying the terminal electrode T2 and the terminal electrode TC with the non-display voltage. With this structure, even if the stereoscopic image display device 3 is rotated by 90 degrees, an erect stereoscopic image can be seen.

Note that, the counter electrode 4 of the LC barrier panel 2 has a larger area than the pixel electrode 20 of the liquid crystal display panel 16 and covers the pixel electrode 20. In other words, the counter electrode 4 of the LC barrier panel 2 is a filled-in electrode larger than a display region of the liquid crystal display panel 16. Therefore, the counter electrode 4 has a function of shielding electromagnetic noise or static electricity from the outside so as to protect the liquid crystal display panel 16. Simultaneously, the counter electrode 4 has a function of shielding electromagnetic noise generated from the liquid crystal display panel 16 or the barrier electrode L so as to protect the touch panel 11 disposed thereon from electromagnetic noise.

As the liquid crystal display panel 16, it is possible to use a TN type liquid crystal display panel as well as an in-plane switching type liquid crystal display panel such as an IPS type or an FFS type. The in-plane switching type liquid crystal display panel is vulnerable to electromagnetic noise or static electricity from the outside because the common electrode 21 is not formed on the counter substrate 6. The LC barrier panel 2 of the present invention has a function of shielding electromagnetic noise or static electricity from the outside and has little electromagnetic noise generated from the LC barrier panel 2 itself. Therefore, the LC barrier-device of the present invention is suitable for use in combination with the in-plane switching type liquid crystal display panel to form the stereoscopic image display device.

FIG. 4B illustrates a state where a display image F is viewed by the left and right eyes via the LC barrier panel 2. The LC barrier panel 2 is disposed on the front side of the display panel that displays the display image F. The display image F includes right eye images FR and left eye images FL that are alternately arranged every other line. When viewing this image through the barrier of the LC barrier panel 2, the right eye can see the right eye images FR while the left eye can see the left eye images FL. With this structure, the display image F can be recognized in a stereoscopic manner.

Figure 5:
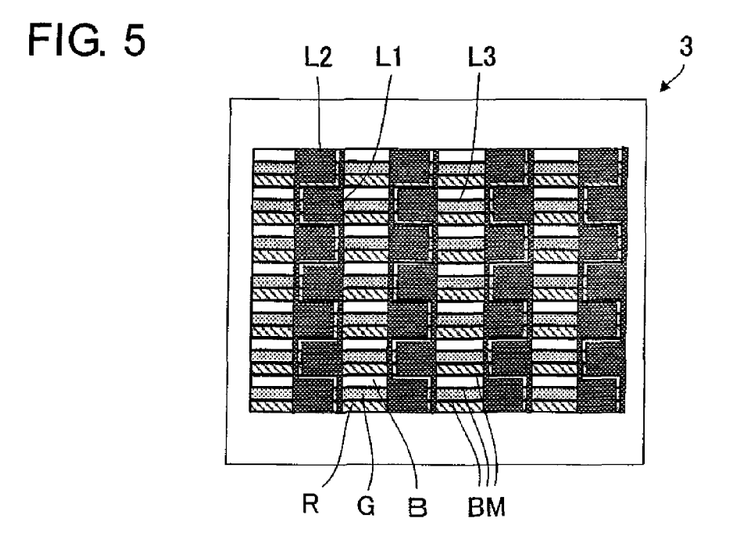
FIG. 5 is a diagram illustrating a barrier relationship between pixels of a color display panel and the LC barrier panel.

FIG. 5 is a diagram illustrating the stereoscopic image display device 3 using a color display panel as the display panel and illustrates a state where the color display panel is displayed through the LC barrier panel. The color display panel has pixels, each of which is constituted by a red sub-pixel R, a green sub-pixel G, and a blue sub-pixel B. The individual sub-pixels are separated by a black color mask BM. The stereoscopic image display device 3 is normally used as a landscape type as illustrated in FIG. 5, and the LC barrier panel displays the vertical barrier in which the first barrier electrode L1 and the second barrier electrode L2 are turned on. In this case, the sub-pixels having a plurality of different colors are arranged vertically. In other words, a longitudinal direction of the sub-pixels of the respective colors is the horizontal direction orthogonal to the barrier direction.

If the sub-pixels of the plurality of colors are arranged horizontally, the longitudinal direction of the sub-pixels of the respective colors becomes parallel to the vertical barrier. Therefore, if the viewing direction is changed to the horizontal direction, the barrier may overlap with only a sub-pixel of a specific color. In this case, the size of the sub-pixel viewed by the observer may change depending on the color, and hence the observer cannot view the display image with correct colors. In contrast, if the sub-pixels of the plurality of colors are arranged in the direction orthogonal to the barrier direction as illustrated in FIG. 5, even if the viewing direction is changed, the barrier overlap with all the color sub-pixels. Therefore, the colors of the image do not change greatly. Thus, observation with correct colors can be easily realized.

Fourth Embodiment

Figure 6A:
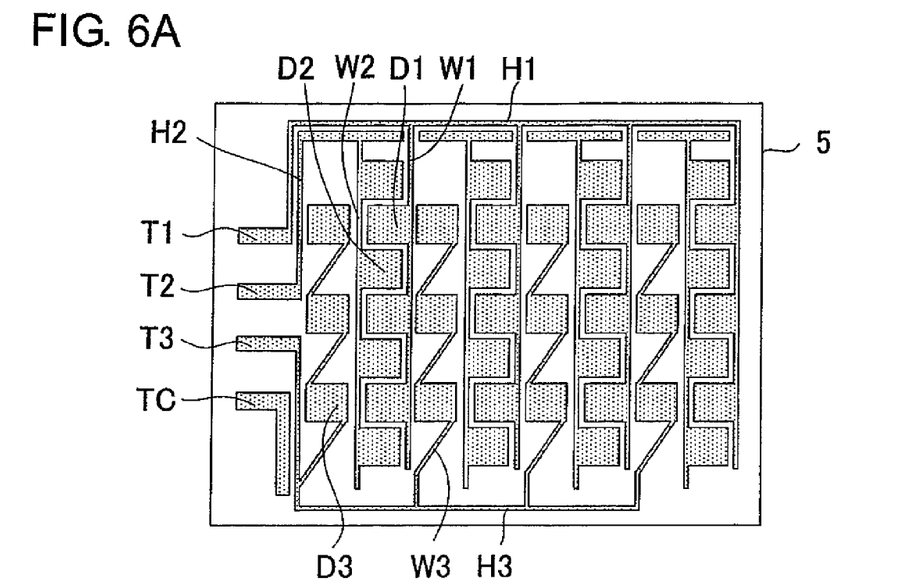
FIG. 6A is a schematic diagram illustrating electrodes formed on a substrate of a LC barrier panel according to a fourth embodiment of the present invention.
Figure 6B:
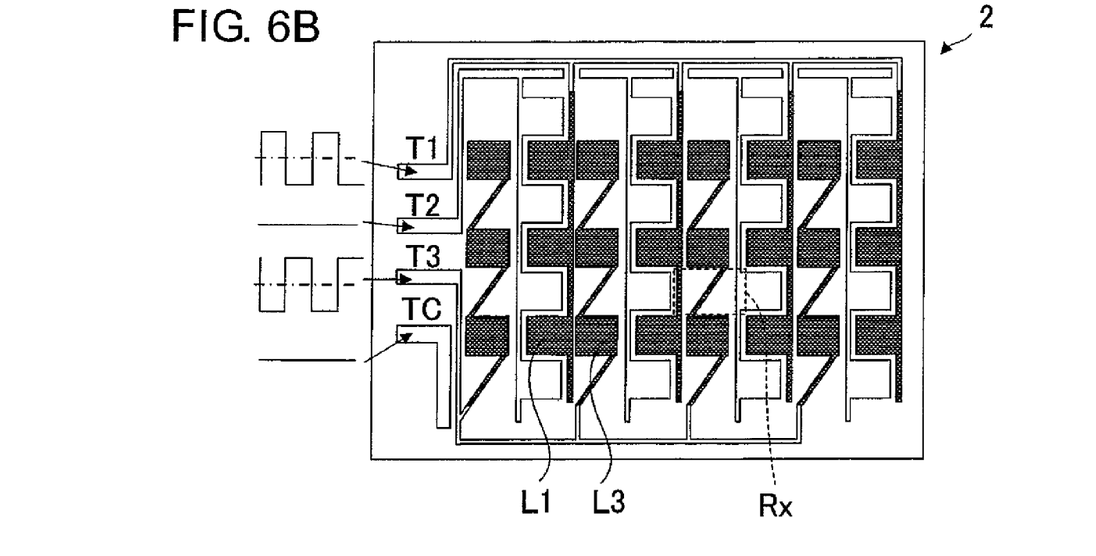
FIG. 6B is a schematic diagram illustrating a horizontal stripe display state of a LC barrier-device of the fourth embodiment.

A LC barrier-device of this embodiment is different from that of the first embodiment in that the third connection wiring W3 for connecting the plurality of third barrier pixels D3 is formed obliquely. The other structure is basically the same as that of the first embodiment, and overlapping description is omitted appropriately. FIG. 6A is a plan view schematically illustrating the barrier electrode L formed on the surface of the substrate 5. FIG. 6B illustrates a state where the first barrier electrode L1 and the third barrier electrode L3 are turned on so that the horizontal stripe barrier is formed.

As illustrated in FIG. 6A, the first barrier pixels D1 and the second barrier pixels D2 are arranged alternately in the vertical direction on the substrate 5. In addition, the first barrier pixels D1 and the third barrier pixels D3 are arranged alternately in the horizontal direction. The first connection wiring W1 connects the first barrier pixels D1 vertically, and the second connection wiring W2 connects the second barrier pixels D2 vertically. The third connection wiring W3 is an oblique wiring disposed for connecting adjacent third barrier pixels D3. FIG. 6B illustrates a state where the terminal electrode T1 and the terminal electrode T3 are supplied with alternating voltages having opposite polarities, and the terminal electrode T2 and the terminal electrode TC are supplied with the GND potential so as to perform the horizontal stripe barrier display. The observer observes pixels of the color display panel through a region Rx in FIG. 6B. In this case, the left eye observes pixels displaying the left eye image while the right eye observes pixels displaying the right eye image.

Figure 7A:
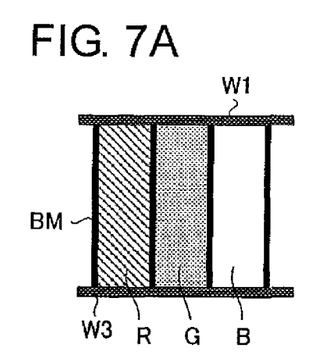
FIG. 7A is a diagram illustrating color display pixels observed through the LC barrier panel of the first embodiment.
Figure 7B:
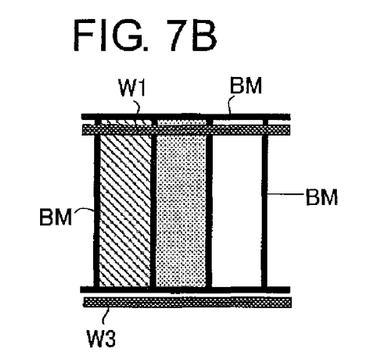
FIG. 7B is a diagram illustrating color display pixels observed through the LC barrier panel of the first embodiment.
Figure 8A:
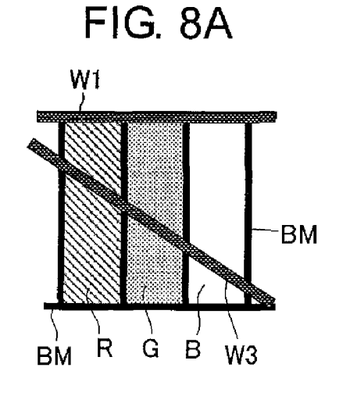
FIG. 8A is a diagram illustrating color display pixels observed through the LC barrier panel of the fourth embodiment.
Figure 8B:
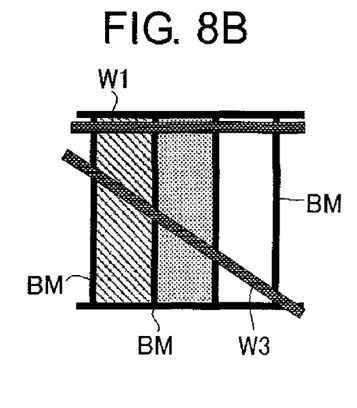
FIG. 8B is a diagram illustrating color display pixels observed through the LC barrier panel of the fourth embodiment.

The stereoscopic image display device performing the horizontal stripe barrier display as illustrated in FIG. 6B is actually observed as the portrait type after rotated from the landscape type by 90 degrees. One pixel of the color display panel observed through the region Rx in this case is illustrated in FIGS. 7A, 7B, 8A, and 8B. FIGS. 7A and 7B illustrate a case where the barrier electrode of the first embodiment is applied to the third embodiment. FIGS. 8A and 8B illustrate a case where the barrier electrode of this embodiment is applied to the third embodiment. One pixel is constituted by the red color sub-pixel R, the green color sub-pixel G, and the blue color sub-pixel B. Each sub-pixel is surrounded by the black color mask BM. Because the LC barrier panel and the color display panel are overlapped with each other, a pitch of the barrier pixels D is not the same as a pixel pitch of the color display panel. Each pitch is determined based on the position of the observer and the viewing angle. Therefore, when viewing at an assumed angle, the black color mask BM of the color display panel and the connection wiring W of the LC barrier panel are viewed to be overlapped. FIG. 7A illustrates a case of using the barrier electrode having the shape illustrated in the first embodiment. As illustrated in FIG. 7A, the black color mask BM in the horizontal direction in FIG. 7A is overlapped with the first connection wiring W1 and the third connection wiring W3. However, if the viewing angle is shifted a little, the black color mask BM is not overlapped with the first connection wiring W1 and the third connection wiring W3 depending on the position of the pixel. FIG. 7B illustrates this state. In this way, if the viewing angle is shifted from an optimal point, both the pixel viewed as illustrated in FIG. 7A and the pixel viewed as illustrated in FIG. 7B are observed depending on the position of the pixel. The pixel of FIG. 7B has a smaller effective area than the pixel of FIG. 7A, and hence a difference of luminance is sensed depending on the position of the pixel. Therefore, as the viewing direction changes, the display state such as luminance of the display changes greatly. On the other hand, in this embodiment, the first connection wiring W1 and the black color mask BM are the same as those of the first embodiment, but the third connection wiring W3 is oblique with respect to the black color mask BM. FIG. 8A illustrates a case where the viewing direction is not shifted, in which the pixel is still overlapped with the third connection wiring W3 so that the effective area is decreased. FIG. 8B illustrates a case where the viewing direction is shifted, in which the first connection wiring W1 is also overlapped, but a decreasing ratio of the effective area is smaller than the case of FIGS. 7A and 7B. Therefore, a ratio of change of the overlapping area between the black color mask BM and the connection wiring is smaller than the case of FIGS. 7A and 7B even if the viewing angle is shifted in some degree. As a result, the change of the display state with respect to the change of the viewing direction can be decreased as compared to the barrier electrode having the shape of the first embodiment.

Note that, this embodiment shows an example in which the sub-pixels of the respective colors are arranged in the horizontal direction, and each sub-pixel is surrounded by the black color mask BM. However, it is apparent that even if the sub-pixels of the respective colors are arranged in the vertical direction, the overlapping area between the black color mask BM and the third connection wiring W3 is scarcely changed with respect to the viewing angle so that the same effect can be obtained. Because the third connection wiring W3 is formed obliquely with respect to the black color mask BM, the change of the display state with respect to the change of the viewing direction can be decreased when the stereoscopic image display device 3 is rotated by 90 degrees.

Fifth Embodiment

A LC barrier panel of this embodiment further includes fourth barrier pixels D4, fourth connection wirings W4, and a terminal electrode T4 electrically connected to the fourth connection wirings W4. In this respect, this embodiment is different from the first embodiment. The other parts are the same as those of the first embodiment, and overlapping description is omitted appropriately.

Figure 9A:
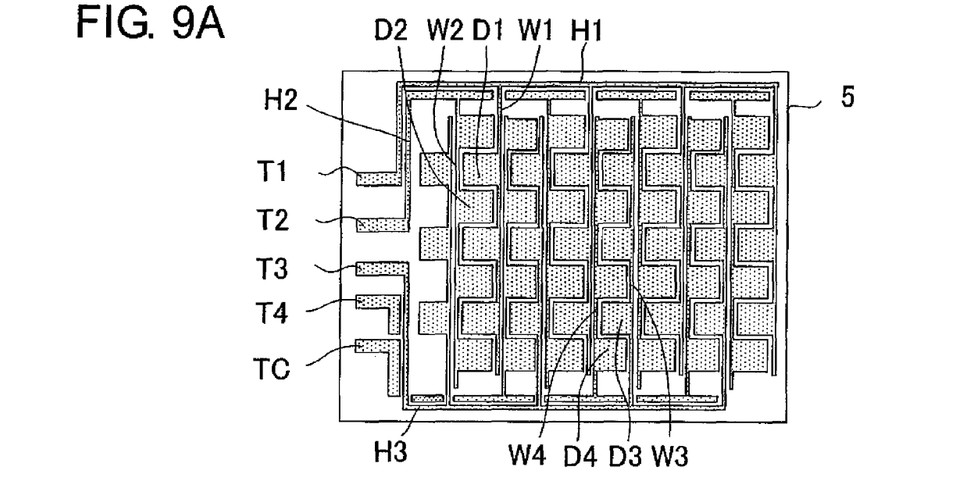
FIG. 9A is a schematic diagram illustrating electrodes formed on a substrate of a LC barrier panel according to a fifth embodiment of the present invention.

FIG. 9A is a schematic plan view illustrating the shape of the barrier electrodes formed on the surface of the substrate 5. The fourth barrier pixels D4 and the third barrier pixels D3 are arranged alternately in the vertical direction. The fourth connection wiring W4 connects the plurality of fourth barrier pixels D4 in the vertical direction. Therefore, the fourth connection wiring W4 is formed to be parallel to the other first to third connection wirings W1 to W3 in the vertical direction. The fourth connection wiring W4 is electrically connected to the terminal electrode T4 via a j camper electrode (not shown). The j upper electrode is formed on the inner surface of the counter substrate 6 similarly to the terminal electrode T2 and electrically connects adjacent fourth connection wirings W4 and the terminal electrode T4.

Figure 9B:
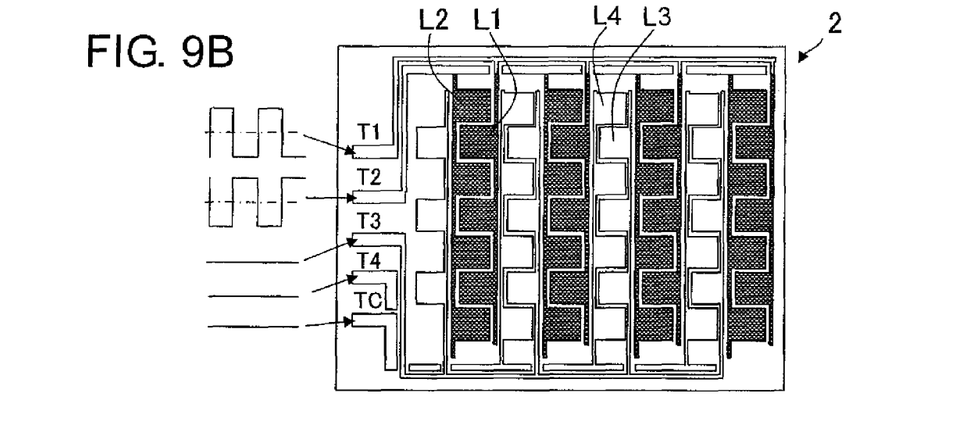
FIG. 9B is a schematic diagram illustrating a vertical stripe display state of a LC barrier-device of the fifth embodiment.
Figure 9C:
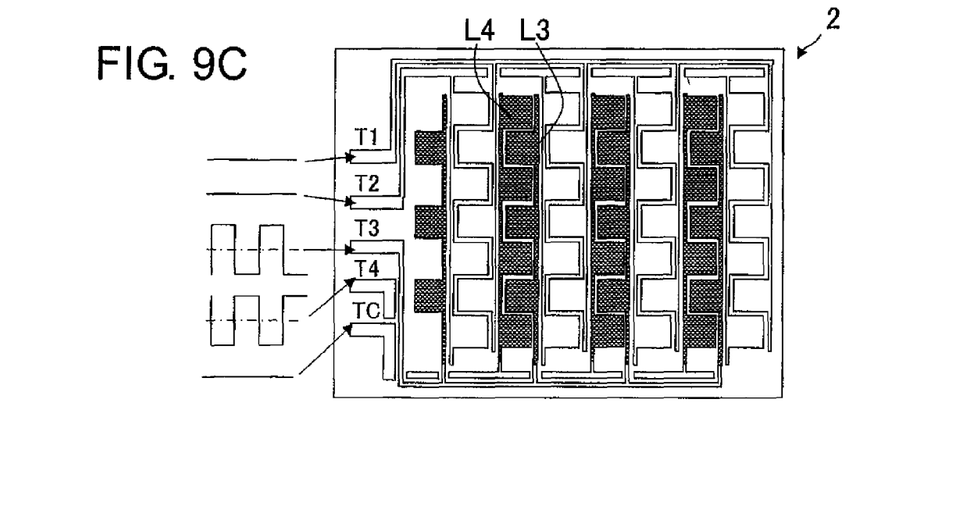
FIG. 9C is a schematic diagram illustrating a vertical stripe display state of the LC barrier-device of the fifth embodiment.

FIG. 9B illustrates a state where the first barrier electrode L1 and the second barrier electrode L2 are turned on so that the vertical stripe barrier is formed. In this case, the terminal electrode T1 and the terminal electrode T2 are supplied with alternating voltages having opposite polarities to each other from the drive portion, and the terminal electrodes T3, T4, and TC are supplied with the GND potential. With this structure, the first barrier electrode L1 and the second barrier electrode L2 are turned on to be the non-transparent state. The third barrier electrode L3 and the fourth barrier electrode L4 are applied with the non-display voltage, and hence maintain the transparent state. As a result, the vertical stripe barrier is formed. FIG. 9C illustrates a state in which the third barrier electrode L3 and the fourth barrier electrode L4 are turned on so that the vertical stripe barrier is formed. In this state, the terminal electrode T3 and the terminal electrode T4 are supplied with alternating voltages having opposite polarities to each other, and the terminal electrodes T1, T2, and TC are supplied with the GND potential. The barrier (vertical stripe) of FIG. 9C has a relationship in which the barrier is shifted from the barrier of FIG. 9B by one column. For instance, in the case of "reverse view" of the stereoscopic image in which projections and depressions are reversed, a normal stereoscopic image can be recognized by switching the barrier pattern from FIG. 9B to FIG. 9C. In other words, the position of the barrier pattern can be changed according to the viewing angle.

The position of the barrier pattern can be changed in the same manner also in the case where the LC barrier panel 2 is rotated by 90 degrees. In other words, switching is performed between the case where the terminal electrodes T1 and T3 are supplied with the display voltage while the terminal electrodes T2, T4, and TC are supplied with the non-display voltage to display the barrier, and the case where the terminal electrodes T2 and T4 are supplied with the display voltage while the terminal electrodes T1, T3, and TC are supplied with the non-display voltage to display the barrier.

Note that, in each case, the two barrier pixel electrodes adjacent to each other are applied with the display voltages that are alternating voltages having opposite polarities to each other, and hence electromagnetic noises due to the alternating voltages are canceled by each other. Further, because the counter electrode 4 having a filled-in shape covering the display region of the display panel is formed on the counter substrate 6, electromagnetic noise is prevented from radiating upward, and electromagnetic noise and static electricity entering from the outside are shielded. With this structure, it is possible to prevent the touch panel disposed on the upper side of the LC barrier panel and the display panel disposed on the lower side thereof from a malfunction due to electromagnetic noise and a breakdown due to static electricity.

What is claimed is:

1. A stereoscopic image display device comprising: a display panel and a LC barrier panel placed upward the display panel;
    the display panel includes first column electrodes and second column electrodes, the first column electrodes can display an image for right eye and the second column electrodes can display an image for left eye, the first column electrodes and the second column electrodes are alternately formed;
    the LC barrier panel includes a substrate, a counter substrate, a sealant for bonding the substrate and the counter substrate with a predetermined gap, and a liquid crystal layer filled in the predetermined gap;
    first barrier pixels and second barrier pixels are alternately arranged in a vertical direction on the substrate;
    third barrier pixels and the first barrier pixels are alternately arranged in a horizontal direction on the substrate;
    a counter electrode formed on the counter substrate, the counter electrode is opposed to all of the first barrier pixels, the second barrier pixels and the third barrier pixels;
    when the LC barrier panel performs vertical stripe barrier display, a third signal supplied to the third barrier pixels and a counter signal supplied to the counter electrode are the same drive signal, and a first signal supplied to the first barrier pixels makes an effective voltage for the liquid crystal layer between the counter electrode and the first barrier pixels, and a second signal supplied to the second barrier pixels makes an effective voltage for the liquid crystal layer between the counter electrode and the second barrier pixels; and
    when the LC barrier panel performs horizontal stripe barrier display, the second signal and the counter signal are the same drive signal, and the first signal makes an effective voltage for the liquid crystal layer between the counter electrode and the first barrier pixels, and the third signal makes an effective voltage for the liquid crystal layer between the counter electrode and the third barrier pixels.

2. A stereoscopic image display device according to claim 1, wherein the same drive signal is a constant voltage.

3. A stereoscopic image display device according to claim 2, wherein the constant voltage is a GND potential.

4. A stereoscopic image display device according to claim 2, wherein:
    when the LC barrier panel performs the vertical stripe barrier display, the first signal is a waveform of alternating voltages and the second signal is a waveform of alternating voltages having opposite polarities to the first signal;
    when the LC barrier panel performs the horizontal stripe barrier display, the first signal is a waveform of alternating voltages and the third signal is a waveform of alternating voltages having opposite polarities to the first signal.

5. A stereoscopic image display device according to claim 1, further comprising a first connection wiring that vertically connects a plurality of the first barrier pixels, a second connection wiring that vertically connects a plurality of the second barrier pixels, and a third connection wiring that vertically connects a plurality of the third barrier pixels,
    wherein the plurality of the first barrier pixels and the first connection wiring constitute a first barrier electrode, the plurality of the second barrier pixels and the second connection wiring constitute a second barrier electrode, and the plurality of the third barrier pixels and the third connection wiring constitute a third barrier electrode.

6. A stereoscopic image display device according to claim 5, wherein the counter substrate further comprises a jumper electrode that is electrically separated from the counter electrode, and one of the first barrier electrode, the second barrier electrode and the third barrier electrode is electrically connected to the jumper electrode via a conductive material mixed into the sealant.

7. A stereoscopic image display device according to claim 5, wherein the third connection wiring obliquely wires between the adjacent third barrier pixels in the vertical direction.

8. A stereoscopic image display device according to claim 5, wherein the substrate further comprises fourth barrier pixels arranged alternately with the third barrier pixels in the vertical direction.

9. A stereoscopic image display device according to claim 5, wherein the first column electrodes and the second column electrodes include a plurality of pixels for displaying;
   each of the pixels includes sub-pixels, each sub-pixels has a different color, the sub-pixels are arranged in the vertical direction, and a gap formed between the each sub-pixels extends in the horizontal direction.

10. A stereoscopic image display device according to claim 9,
   wherein the third connection wiring is disposed obliquely with respect to an arrangement direction of the sub-pixels.

11. A stereoscopic image display device according to claim 1, further comprising: detection electrodes constituting a touch panel are formed on an upper surface of the counter substrate.

12. A stereoscopic image display device according to claim 1, further comprising: a drive portion that outputs the first signal, the second signal, the third signal and the counter signal; wherein
   the substrate further comprises fourth barrier pixels arranged alternately with the third barrier pixels in the vertical direction;
   the drive portion outputs the fourth signal supplied to the fourth barrier pixels and switches between supply of a first drive waveform and a second drive waveform to change a position of a vertical stripe to be displayed;
   the first drive waveform gives an effective voltage to the liquid crystal layer between the counter electrode and the first barrier pixels and between the counter electrode and the second barrier pixels; and
   the second drive waveform gives an effective voltage to the liquid crystal layer between the counter electrode and the third barrier pixels, and between the counter electrode and the fourth barrier pixels.

* * * * *